(12) United States Patent
Mantin et al.

(10) Patent No.: US 7,158,721 B2
(45) Date of Patent: Jan. 2, 2007

(54) PERFORMANCE MONITORING OF MULTIPLE CHANNELS IN AN AUTOMATIC PROTECTION SWITCHED NETWORK

(75) Inventors: Sharon Mantin, Tel Aviv (IL); David Zelig, Givatayim (IL); Shmuel Ilan, Raanana (IL); Leon Bruckman, Petah Tikva (IL)

(73) Assignee: Corrigent Systems Ltd., Tel Aviv (IL)

( * ) Notice: Subject to any disclaimer, the term of this patent is extended or adjusted under 35 U.S.C. 154(b) by 624 days.

(21) Appl. No.: 10/082,771

(22) Filed: Feb. 25, 2002

(65) Prior Publication Data

US 2004/0208527 A1 Oct. 21, 2004

(51) Int. Cl.
*H04B 10/00* (2006.01)
(52) U.S. Cl. .......................................... 398/25; 398/1
(58) Field of Classification Search ............... 398/1–39
See application file for complete search history.

(56) References Cited

U.S. PATENT DOCUMENTS

| | | | |
|---|---|---|---|
| 5,159,595 A | 10/1992 | Flanagan et al. | |
| 5,307,353 A | 4/1994 | Yamashita et al. | |
| 5,878,032 A | 3/1999 | Mirek et al. | |
| 5,925,137 A | 7/1999 | Okanoue et al. | |
| 6,058,102 A | 5/2000 | Drysdale et al. | |
| 6,067,288 A * | 5/2000 | Miller et al. | 370/242 |
| 6,216,207 B1 * | 4/2001 | Miller et al. | 711/133 |
| 6,233,073 B1 | 5/2001 | Bowers et al. | |
| 6,246,667 B1 | 6/2001 | Ballintine et al. | |
| 6,282,173 B1 * | 8/2001 | Isonuma et al. | 370/242 |
| 6,366,556 B1 | 4/2002 | Ballintine et al. | |
| 6,438,603 B1 | 8/2002 | Ogus | |
| 6,456,587 B1 | 9/2002 | Taniguchi | |
| 6,680,906 B1 | 1/2004 | Nguyen | |
| 6,868,094 B1 | 3/2005 | Bordonaro et al. | |
| 2001/0046074 A1 * | 11/2001 | Kakizaki et al. | 359/110 |

OTHER PUBLICATIONS

Synchronous Optical Network (SONET) Transport Systems: Common Generic Criteria, Telcordia Technologies, Piscataway, New Jersey, Publication GR-253-CORE, Sep. 2000.
Official Action dated Apr. 4, 2005, which issued during the prosecution of Applicant's U.S. Appl. No. 09/941,723.
H. Schulzrinne, RTP: A Transport Protocol fo Real-Time Applications, Jan. 1996, IETF, RFC 1889.

* cited by examiner

*Primary Examiner*—Agustin Bello
(74) *Attorney, Agent, or Firm*—Weingarten, Schurgin, Gagnebin & Lebovici LLP

(57) ABSTRACT

A performance management unit manages a primary interface and a standby or secondary interface to two channels of an optical communications network having APS capabilities. Each performance parameter is associated with three counters. First and second counters are linked to registers of the primary and the secondary ports, and the third counter is linked to the registers of the currently active port. When a protection switch occurs, the first and second counters are immediately read and reset. The third counter continues accumulating data, but becomes associated with the new active port. At the end of a read interval, the third counter correctly reflects the number of data received, regardless of switchovers between the primary and secondary channels.

42 Claims, 7 Drawing Sheets

PERFORMANCE MONITORING OF MULTIPLE CHANNELS IN AN AUTOMATIC PROTECTION SWITCHED NETWORK

BACKGROUND OF THE INVENTION

1. Field of the Invention

This invention relates generally to communication networks. More specifically, this invention relates to performance monitoring in high-speed packet networks and time-division multiplexed networks.

2. Description of the Related Art

A number of acronyms well known in the art are summarized in Table 1.

TABLE 1

| ACRONYM | Meaning |
|---|---|
| AIS | alarm indication signal |
| APS | automatic protection switching |
| BER | bit error rate |
| BIP | bit interleaved parity |
| CV | code violation |
| DS-N | digital signal at level N |
| ES | errored seconds |
| ES-LFE | far end line errored second |
| ES-S | Section Errored Second |
| LOF | loss of framing |
| LOS | loss of signal |
| MPLS | multiple protocol label switching |
| OC-N | optical carrier level at level N |
| OS | operations system |
| PDH | plesiochronous digital hierarchy |
| POH | payload overhead |
| RDI | remote defect indication |
| REI | remote error indication |
| SDH | synchronous digital hierarchy |
| SEF | severely eroded framing |
| SEF | severely errored framing |
| SES | severely errored second |
| SNMP | simple network management protocol |
| SONET | synchronous optical network |
| SPE | synchronous payload envelope |
| STM | signaling traffic management |
| STS-N | synchronous transport signals at level N |
| TDM | time-division multiplexed |
| TOH | transport overhead |
| UAS | Unavailable seconds. A count of the seconds during which a layer was considered to be unavailable. |

High-speed communications networks continue to increase in importance in modern telecommunications. Efficient performance monitoring has become desirable in many kinds of networks, including optical networks, conventional data networks such as Ethernet, and MPLS ATM networks.

As an example, the Synchronous Optical Network (SONET) is a set of standards that define a hierarchical set of transmission rates and transmission formats for carrying high-speed, time-domain-multiplexed (TDM) digital signals. SONET lines commonly serve as trunks for carrying traffic between circuits of the plesiochronous digital hierarchy (PDH) used in circuit-switched communication networks. SONET standards of relevance to the present patent application are described, for example, in the document *Synchronous Optical Network (SONET) Transport Systems: Common Generic Criteria* (Telcordia Technologies, Piscataway, N.J., publication GR-253-CORE, September, 2000). While the SONET standards have been adopted in North America, a parallel set of standards, known as Synchronous Digital Hierarchy (SDH), has been promulgated by the International Telecommunications Union (ITU), and is widely used in Europe. From the point of view of the present invention, these alternative standards are functionally interchangeable.

There are four optical interface layers in SONET: path layer, line layer, section layer and photonic layer. These optical interface layers have a hierarchical relationship, with each layer building on the services provided by the lower layers. Each layer communicates with peer equipment in the same layer and processes information and passes it up and down to the next layer by mapping the information into a differently organized format and by adding overhead. In a simplified example, network nodes exchange information as digital signals (DS-1 signals) having a relatively small payload. At a source node of the path layer several DS-1 signals are packaged to form a synchronous payload envelope (SPE) composed of synchronous transport signals (STS) at level 1 (STS-1) along with added path overhead. The SPE is handed over to the line layer. The line layer concatenates multiple SPEs, and adds line overhead. This combination is then passed to the section layer. The section layer performs framing, scrambling, and addition of section overhead to form STS-Nc modules. Finally the photonic layer converts the electrical STS-Nc modules to optical signal and transmits them to a distant peer node as optical carriers (OC-N signals).

At the distant peer node, the process is reversed. First, at the photonic layer the optical signal is converted to an electrical signal, which is progressively handed over to lower levels, respective overheads being stripped off, until the path layer is reached. The DS-1 signals are unpackaged, and terminate at the destination node.

The lowest-rate link in the SONET hierarchy is the optical carrier level (OC-1) at the path layer, which is capable of carrying 8000 STS-1 frames per second, at a line rate of 51.840 Mbps. An STS-1 frame contains 810 bytes of data, which are conventionally organized as a block of nine rows by 90 columns. The first three columns hold transport overhead (TOH), while the remaining 87 columns carry the information payload, referred to as the synchronous payload envelope (SPE). The SPE contains one column of payload overhead (POH) information, followed by 86 columns of user data. The POH can begin at any byte position within the SPE capacity of the payload portion of the STS-1 frame. As a result, the SPE typically overlaps from one frame to the next. The TOH of each frame contains three pointer bytes (H1, H2, H3), which are used to indicate where in each frame the POH begins and to compensate for timing variations between the user input lines and the SONET line on which the STS-1 frames are transmitted.

STS-1 frames can efficiently transport DS-3 level signals, operating at 44.736 Mbps. The STS-1 frames themselves are not too much larger than DS-3 frames. When signals at rates below DS-3 are to be carried over SONET, the SPE of the STS-1 frame is divided into sections, known as virtual tributaries (VTs), each carrying its own sub-rate payload. The component low-rate signals are mapped to respective VTs, so that each STS-1 frame can aggregate sub-rate payloads from multiple low-rate links. Multiple STS-1 frames can be multiplexed (together with STS-Mc frames) into STS-N frames, for transmission on OC-N links at rates that are multiples of the basic 51.840 Mbps STS-1 rate.

Maintenance criteria are extensively specified in the above-noted Telcordia publication GR-253-CORE to enable the maintenance of the integrity of the network and individual network elements. Maintenance includes the general undertakings of (1) defect detection and the declaration of failures, (2) verification of the continued existence of a problem, (3) sectionalization of a verified problem, (4) isolation, and (5) restoration.

Performance monitoring, to which this application particularly relates, is important and sometimes essential to the conduct of the various above-mentioned tasks in network maintenance for data networks in general. Performance monitoring, as used herein, relates to in-service, non-intrusive monitoring of transmission quality. Network elements are required to support performance monitoring as appropriate to the functions provided at their respective levels in the network. Network elements are also required to perform self-inventory, by which a network element reports information to the performance monitor about its own equipment, as well as adjacency information concerning other network elements to which it is physically or logically connected. The above-noted Telcordia publication GR-253-CORE contains generic performance monitoring strategies, discusses various types of performance monitor registers (e.g., current period, previous period, and threshold registers), and defines performance monitor parameters for the various signals which are found in SONET communication.

A principal approach taken in SONET performance monitoring is the accumulation by network elements of various performance monitor parameters based on performance "primitives" that it detects in the incoming digital bit stream. Primitives can be either anomalies or defects. An anomaly is defined to be a discrepancy between the actual and desired characteristics of an item. A defect is defined to be a limited interruption in the ability of an item to perform a required function. The persistence of a defect results in a failure, which is defined to be the termination of the ability of an item to perform a required function. A large number of defects and failures are defined in the above-noted Telcordia publication GR-253-CORE.

Functionally, performance monitoring is performed at each layer, independent of the other layers. However, part of the functional model assumes that layers pass maintenance signals to higher layers. For example, a defect, such as Loss of Signal (LOS) occurring at the section layer causes an alarm indication signal (AIS-L) to be passed to the line layer, which in turn causes an alarm signal (AIS-P) to be transmitted to the STS Path layer. Thus, an AIS defect can be detected at a particular layer either by receiving the appropriate AIS on the incoming signal, or by receiving it from a lower layer. In consequence, performance monitor parameters at a level are influenced by defects and failures occurring at other levels.

Thresholds are defined for most of the performance monitor parameters supported by SONET network elements. These are used by the performance monitor to detect when transmission degradations have reached unacceptable levels. It is common for hysteresis to be employed before a declared defect or failure can be terminated, in order to assure stability of the system. Thresholds are widely used in the SONET protocol. For example, one type of threshold specifies when a defect should be reclassified as a failure. Another use is alarm generation when a performance monitor counter exceeds a predefined threshold.

Accumulation intervals are defined for each performance monitor parameter. Data accumulated in successive accumulation intervals are required to be independently maintained in a memory as a pushdown stack during a current day's operation. Each network element reports its statuses and results periodically to a higher authority or performance monitor management system. It is the responsibility of the performance monitor management system to derive time-based calculations such as the time during which a defect or failure persisted (errored seconds) and other performance monitor related parameters. Each of the parameters that have to be calculated is dependent on one or more variables related to SONET defects, SONET counters, and SONET failures.

For example, severely eroded seconds at the line level are monitored using the performance monitor parameter SES-L. This parameter is advanced if any of the following SONET defects was active during the previous second: severely eroded framing (SEF), loss of signal (LOS), and alarm indication signal (AIS-L).

As a second example, the counter CV-L counts coding violations at the line level. The performance monitor parameter SES-L is advanced if the SONET counter CV-L is above 9834.

Various linear automatic protection-switching architectures are commonly implemented in optical networks and many other networks, e.g., Ethernet, and MPLS, in order to provide fault tolerance. Examples of these are known as the 1+1 architecture, the 1:1 architecture and the 1:n architecture.

In the 1+1 architecture, the head-end signal is continuously communicated to both working and protection equipment, so that the same payloads are transmitted identically to the tail-end working and protection equipment. At the tail end, working and protection OC-N signals are monitored independently and identically for failures. The receiving equipment chooses either the working or the protection signal as the one from which to select the traffic. Because of the continuous head-end bridge, the 1+1 architecture does not allow an unprotected extra traffic channel to be provided.

In the 1:n architecture, there are n working channels, any of which can be bridged to a single protection line. Head-end to tail-end signaling is accomplished by using the secondary, or protection channel. Because the head end is switchable, the protection line can be used to carry an extra traffic channel.

The 1:1 architecture is actually a special case of the 1:n architecture, in which n is 1. It is specially mentioned mainly because there are conventions according to the above-noted Telcordia publication GR-253-CORE, which allow line terminating equipment employing the 1+1 architecture to interoperate with line terminating equipment employing the 1:1 architecture. These conventions are outside the scope of this disclosure.

When a user leases a protected network connection from a service provider, a certain quality-of-service level (QoS) is warranted. For example, the service provider may guarantee that over any X-minute period, the average bit rate of the connection will be no less than Y bps. To protect network integrity, the actual connection is typically made up of two or more physical lines, known as the working and protection lines. This protection arrangement is transparent to the user.

Conventionally, the operator has been able to obtain performance data on each of the working and protection lines individually. However, the network has not been set up to provide a collective reading for the protection pair. The performance of the lines the working and protection lines is monitored individually, often by separate processors, and without mutual coordination. Furthermore, the performance data are gathered at long intervals. Thus, the user and service provider have no straightforward way of checking the combined performance of the working and protection lines minute-by-minute. Such combined monitoring would be desirable in order to ensure that the service provider has met his QoS obligation even during time intervals in which protection switching occurs between the lines.

SUMMARY OF THE INVENTION

It is therefore a primary object of some aspects of the present invention to provide performance monitoring as a user service in a data communications network, which is composed of two interfaces coexisting in a protection relationship.

It is another object of some aspects of the present invention to provide improved coordinated performance monitoring for primary and secondary lines of an optical network employing automatic protection switching.

It is another object of some aspects of the present invention to improve the coordination and efficiency of performance monitoring for data communications networks employing automatic protection switching that are configured according to different linear architectures.

It is a further object of some aspects of the present invention to provide a convenient combined performance monitor for the primary and secondary lines of an automatic protection switched network, in which the performance monitor service does not interfere with the collection of performance data in either the primary or the secondary interface to the lines.

These and other objects of the present invention are attained by a performance management unit, which manages a primary interface and a standby or secondary interface to two channels of an optical communications network. Each performance parameter is associated with three counters. First and second counters are linked to registers of the primary and the secondary ports, and the third, or active counter is linked to the register of the currently active port. When a protection switchover occurs, the first and second counters are immediately read and reset. The third counter continues accumulating data, but becomes associated with the new active port. At the end of a read interval, the third counter correctly reflects the number of data items received, regardless of switchovers between the primary and secondary channels. The counters can accumulate actual data, e.g., data packets, or defects, e.g. ES, dropped packets. After a protection switchover has occurred, the first and second counters continue accumulating the performance data on the primary and secondary channels respectively. The active counter is switched from the primary channel to the secondary channel.

The invention provides a method of monitoring performance of a communications network, including the steps of coupling two communication channels together in a protection-switching configuration, simultaneously monitoring the communication channels, so as to accumulate performance data of one of the channels in an active counter, detecting a protection switchover between the communication channels, and thereafter accumulating performance data of the other channel in the active counter.

An aspect of the method includes memorizing a value of the active counter following expiration of a read interval, and resetting the active counter.

According to yet another aspect of the method, the communications network is an optical communications network.

According to still another aspect of the method, the communications network is a SONET network.

According to an additional aspect of the method, the communications network is an SDH network.

According to another aspect of the method, the protection-switching configuration can he a 1+1 architecture, a 1:1 architecture, or a 1:n architecture.

The invention provides a method of monitoring performance of a communications network, including the steps of coupling two communication channels together in a protection-switching configuration, in which one of the channels operates as an active channel, simultaneously monitoring the communication channels, so as to accumulate first performance data in a first counter and second performance data in a second counter with respect to the first communication channel and the second communication channel respectively. While the first communication channel is operating as the active channel, the method includes accumulating the first performance data in a third counter, detecting a protection switchover between the first communication channel and the second communication channel, and thereafter accumulating the second performance data in the third counter.

After detecting the protection switchover and prior to accumulating the second performance data in the third counter, the method includes resetting the first counter, and resetting the second counter.

A further aspect of the method includes memorizing a value of the third counter following expiration of a read interval, and resetting the third counter.

According to another aspect of the method, after detecting the protection switchover accumulation of the second performance data in the third counter is delayed until expiration of a read interval.

The invention provides a method of monitoring performance of a data network, including the steps of monitoring a first channel of an optical communications network, simultaneously monitoring a second channel of the optical communications network, accumulating first data that is received on the first channel in a first counter, accumulating second data that is received on the second channel in a second counter, accumulating the first data in a third counter, detecting a protection switchover between the first channel and the second channel, and thereafter accumulating the second data in the third counter.

In an additional aspect of the method, the steps of monitoring the first channel and monitoring the second channel are performed at a system interface.

According to still another aspect of the method, the optical communications network is a SONET network or a SDH network.

The invention provides a method of monitoring performance of a data network, including the steps of monitoring a first channel in a SONET network, simultaneously monitoring a second channel in the SONET network, accumulating first data that is received on the first channel in a first counter, accumulating second data that is received on the second channel in a second counter, accumulating the first data in a third counter, detecting a protection switchover between the first channel and the second channel, and thereafter accumulating the second data in the third counter.

The invention provides a performance monitoring apparatus for a data network, including a first port connectable to a first channel of a communications network, a second port connectable to a second channel of the communications network, a first counter for accumulating first data that is received in the first port, a second counter for accumulating second data that is received in the second port, a third counter, a switch for associating the third counter with the first port and the second port. The third counter accumulates the first data or the second data responsive to the switch. The apparatus includes a processor for controlling the first counter, the second counter, the third counter and the switch, wherein in a first mode of operation the first counter and the third counter accumulate the first data, and the second counter accumulates the second data, and in a second mode of operation the first counter accumulates the first data, and the second counter and the third counter accumulate the second data.

An aspect of the performance monitoring apparatus includes a data memory accessible by the processor, wherein responsive to control signals of the processor, values accumulated in the first counter, the second counter, and the third counter are stored in the data memory.

According to one aspect of the performance monitoring apparatus, the control signals are generated at predefined read intervals.

According to another aspect of the performance monitoring apparatus, the first counter, the second counter, and the third counter are software counters.

According to a further aspect of the performance monitoring apparatus, the first port and the second port are disposed at a systems interface of the communications network.

According to yet another aspect of the performance monitoring apparatus, the communications network is an optical communications network.

According to still another aspect of the performance monitoring apparatus, the optical communications network is a SONET or an SDH network.

The invention provides a performance monitoring apparatus for a data network, including a first module and a second module, each of modules having a first port connectable to a first channel of a communications network, a second port connectable to a second channel of the communications network, a first counter for accumulating first data that is received in the first port, a second counter for accumulating second data that is received in the second port, a third counter, a switch for associating the third counter with the first port and the second port. The third counter accumulates one of the first data and the second data responsive to the switch. The apparatus includes a processor for controlling the first counter, the second counter, the third counter and the switch, wherein in a first mode of operation the first counter of the first module and the third counter of the first module accumulate the first data and the second counter of the second module accumulates the second data, and in a second mode of operation the second counter of the first module accumulates the first data, and the first counter of the second module and the third counter of the second module accumulates the second data.

An aspect of the performance monitoring apparatus includes a data memory, wherein values held in the first counter, the second counter, and the third counter are periodically stored in the data memory responsive to control signals of the processor.

According to an aspect of the performance monitoring apparatus, responsive to control signals of the processor, content of the third counter of the first module is transferred to the third counter of the second module.

BRIEF DESCRIPTION OF THE DRAWINGS

For a better understanding of these and other objects of the present invention, reference is made to the detailed description of the invention, by way of example, which is to be read in conjunction with the following drawings, wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server, or on various network elements. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

The preferred embodiment of the invention is presented with reference to optical communications networks, including SONET and SDH architectures, and with reference to specific configurations of these networks. However the teachings of the invention are not limited to such networks and configurations, but are broadly applicable to other communications network protocols in which performance monitoring occurs.

Figure 1:
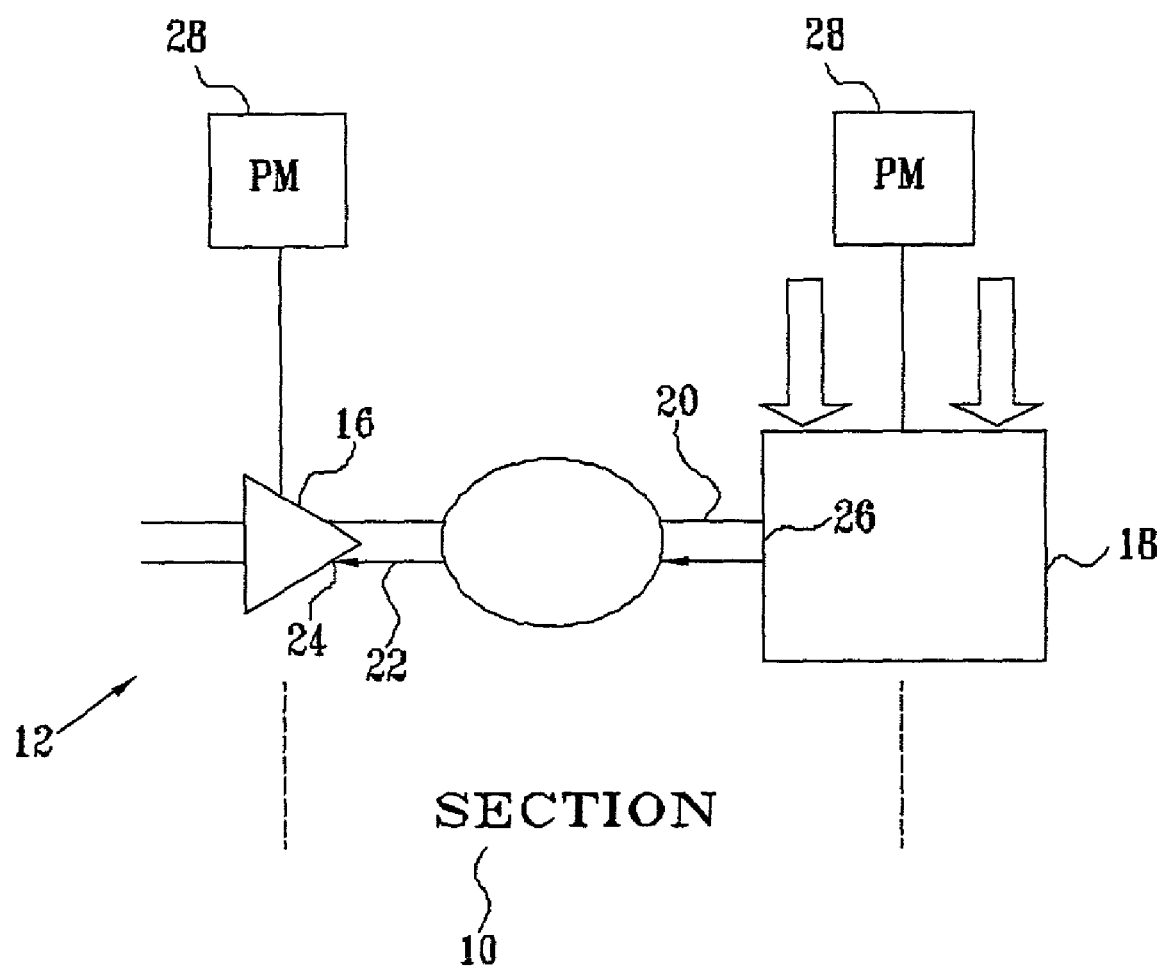
FIG. 1 is a block diagram illustrating an end-to-end connection in a data communications network which is constructed and operative in accordance with a preferred embodiment of the invention.

Turning now to the drawings, reference is made to FIG. 1, which is a high level diagram of a section 10 of a data communications network having an end-to-end connection, which is constructed and operative in accordance with a preferred embodiment of the invention. A section of a communications network 12 is shown. At a path level 14, The network elements of the network 12 are represented by terminating equipment 16 and digital cross-connect 18, which can multiplex and demultiplex a payload. A protection switching arrangement is provided, using two lines 20, 22. The network 12 may be a SONET network, an SDH network, an Ethernet network, an MPLS network, or other digital communication network. System interfaces occur throughout the network 12, and many types of equipment can be used as network elements. System interface 24 and system interface 26 are shown representatively.

Each of the network elements of the network 12 has performance monitoring responsibilities, and is provided with a performance monitor 28. The performance monitor 28 monitors the incoming digital stream, and the prevailing operating conditions of the network element itself. It communicates information to an operations system (OS), via the SONET network or using alternate channels of communication.

While an end-to-end connection is shown in FIG. 1, many alternate network configurations are possible, as may be required by a particular network or application. For example, the embodiments shown herein can be operated equally well with a ring-based network architecture, and are operable with modern resilient packet ring networks.

Turning now to the drawings, reference is made to FIG. 1, which is a high level diagram of a section 10 of a data communications network having an end-to-end connection, which is constructed and operative in accordance with a preferred embodiment of the invention. A section of a communications network 12 is shown. At a path level, The network elements of the network 12 are represented by terminating equipment 16 and digital cross-connect 18, which can multiplex and demultiplex a payload. A protection switching arrangement is provided, using two lines 20, 22. The network 12 may be a SONET network, an SDH network, an Ethernet network, an MPLS network, or other digital communication network. System interfaces occur throughout the network 12, and many types of equipment can be used as network elements. System interface 24 and system interface 26 are shown representatively.

In the case of a SONET network employing linear APS protection switching, each incoming SONET signal is separately monitored for several items that are required to be detected on the line level, both for purposes of protection switching and line performance monitoring. These items include line BIP errors, AIS-L, lower-layer LOS and SEF or LOF defects, RDI-L defects, and REI-L indications. The detection of certain of these items on an incoming signal may result in the generation of REI-L and RDI-L indications in the line overhead on the corresponding outgoing signal.

Figure 2:
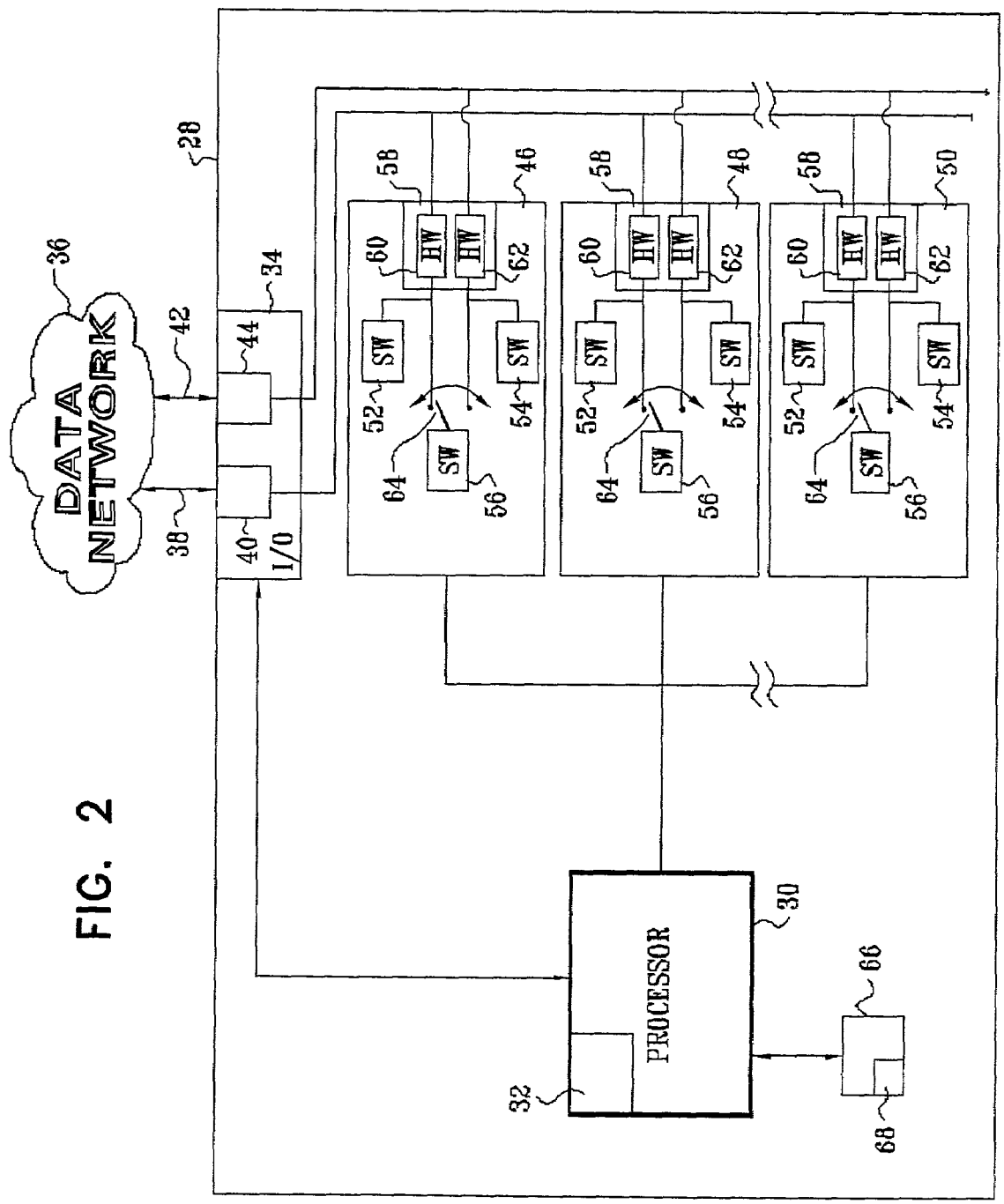
FIG. 2 is a detailed block diagram of a performance manager in the SONET network shown in FIG. 1 in accordance with a preferred embodiment of the invention.

Reference is now made to FIG. 2, which is a detailed block diagram of a performance manager in the network shown in FIG. 1. The performance monitor 28 is provided with a processor 30, which can be realized as a general-purpose computer or a digital signal processor (DSP). In some embodiments, the processor 30 may be a multiprocessor, in which case the derivation of the various performance parameters discussed hereinbelow can be performed in parallel. In still other embodiments, the processor 30 may be shared with the network element associated with the performance monitor 28. The processor 30 is provided with conventional facilities as may be required for its operation, including an execution memory 32, facilities for measuring time intervals in order to synchronize performance monitoring operations, and to timely communicate with other elements of the network 12 (FIG. 1). The processor 30 is able to access its associated network element in order to obtain internal operating parameters. An I/O module 34 of the performance monitor 28 communicates with a data network 36, which is a layer of the network 12 (FIG. 1), Connections are provided to a primary channel 38 via a primary port 40 and a secondary channel 42, also referred to as a protection or stand-by channel, via a secondary port 44.

The performance monitor 28 is provided with a plurality of counter sections, of which counter sections 46, 48, 50 are shown. Each counter section is associated with a particular performance parameter, and comprises three counters 52, 54, 56, which are preferably software (SW) counters. Each counter section also includes a hardware register group, of which hardware register group 58 is referenced in the counter section 46. The hardware register group 58 includes a hardware register 60 that is associated with the primary port 40 and a hardware register 62 that is associated with the secondary port 44. Each of the counters 52, 54, 56 is associated with one of the hardware registers 60, 62. Counter 52 is connected to the primary channel 38. Counter 54 is connected to the secondary channel 42. Counter 56 is connected to a switch 64, and is switchable between the primary channel 38 and the secondary channel 42. The configuration and operation of the counter sections 46, 48, 50, including the association of the counter 56, is controlled by the processor 30, which thus manages two interfaces in an APS configuration of the network 12 (FIG. 1).

In the counter sections 46, 48, 50, the counter 52 and the counter 54 accumulate data of the primary through the primary port 40 the secondary port 44 respectively under control of the processor 30. The counter 56 is also controlled by the processor 30, and accumulates data that is received via the primary port 40 or via the secondary port 44, whichever is currently connected by the switch 64. Preferably, the counters are implemented in software, and the associations between the counters and the ports, and switching operations are realized by addressing or suppression of addressing of the counters by the processor 30 in accordance with program instructions.

The processor 30 is linked to a data memory 66, in which associations with the counter sections 46, 48, 50 and the various counters 52, 54, 56 using an interface index 68. The interface index 68 can be maintained in an information model, such as a management information database (MIB) in the case of a simple network management protocol (SNMP). The value held in the counter 56 is represented as a virtual index. Typically, the counter section 46 counts performance related primitives, for example, ES. Then the data counted by the counter 52 represents the ES on the primary channel 38, and the data counted by the counter 54 represents the ES on the secondary channel 42. Both are indexed by the interface index 68. The value of the counter 56 represents the ES on the active channel.

Figure 3:
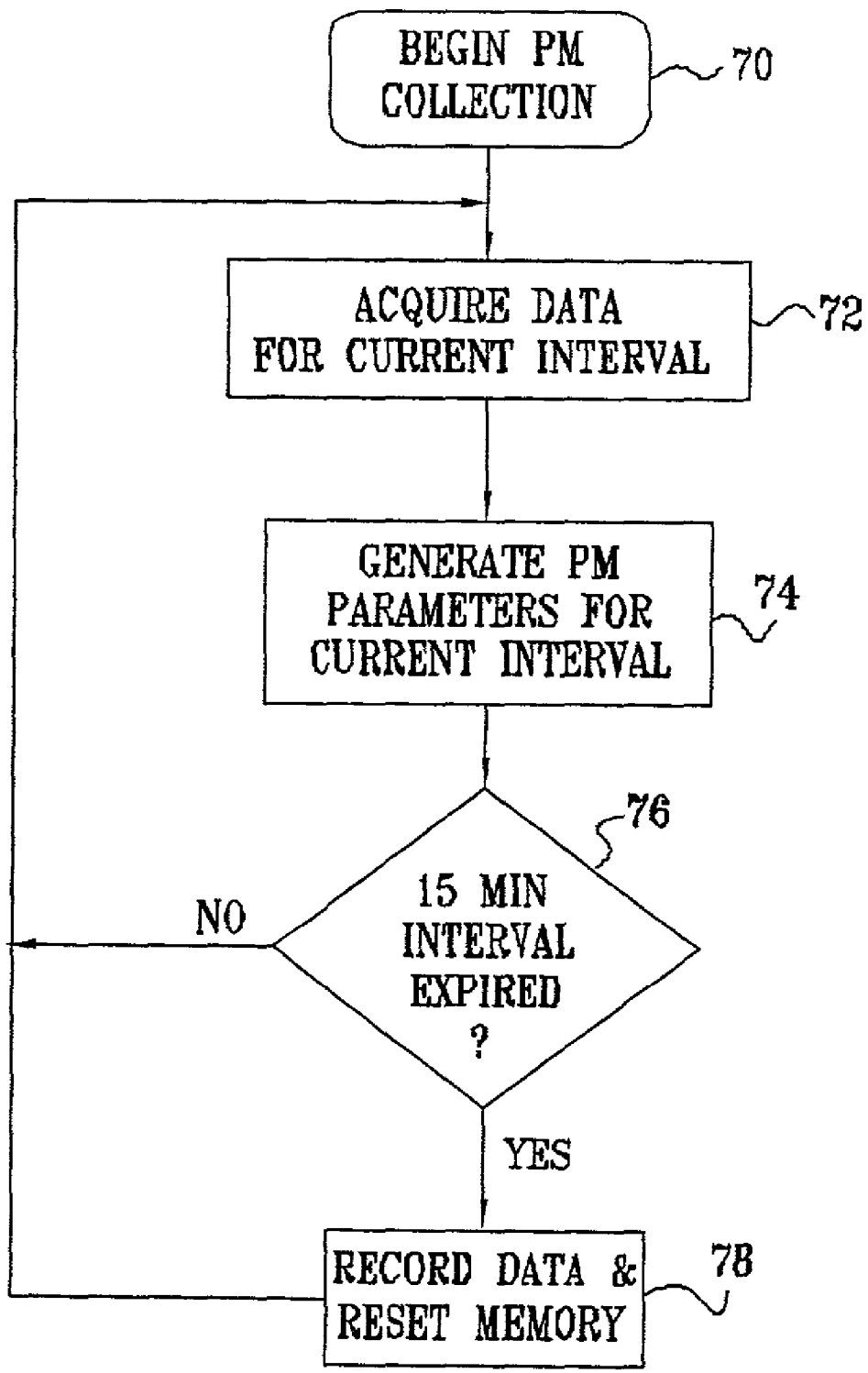
FIG. 3, is a flow chart illustrating a method of performance monitoring in accordance with a preferred embodiment of the invention.

Reference is now made to FIG. 3, which is a flow chart illustrating a method of performance monitoring in accordance with a preferred embodiment of the invention. The disclosure of FIG. 3 is described in conjunction with the operation of the apparatus of FIGS. 1 and 2. General guidelines and assumptions of operation are as follows. For each system interface of the network 12, one of the network elements of the network 12 (FIG. 1) controls automatic protection switching, and is referred to herein as controlling network element. The controlling network element can be either a far end or a near end element, depending on the protection type. In the 1+1 architecture, the control is in the far end, while in the 1:1 and 1:n architectures, the control is in the near end. Typically, one controlling network element is associated with a system interface of the network 12. For example, either the terminating equipment 16 at the system interface 24 or the digital cross-connect 18 associated with the system interface 26 could be designated as a controlling network element. In practice, each system interface is generally assigned to a protection group, and can be designated as either a primary or a secondary interface.

In the counter sections 46, 48, 50, the counter 52 and the counter 54 accumulate data through the primary port 40 the secondary port 44 respectively under control of the processor 30. The counter 56 is also controlled by the processor 30, and accumulates data that is received via the primary port 40 or via the secondary port 44, whichever is currently connected by the switch 64. Preferably, the counters are implemented in software, and the associations between the counters and the ports, and switching operations are realized by addressing or suppression of addressing of the counters by the processor 30 in accordance with program instructions.

The processor 30 is linked to a data memory 66, in which associations with the counter sections 46, 48, 50 and the various counters 52, 54, 56 are accessed using an interface index 68. The interface index 68 can be maintained in an information model, such as a management information database (MIB) in the case of a simple network management protocol (SNMP). The value held in the counter 56 is represented as a virtual index. Typically, the counter section 46 counts performance related primitives, for example, ES. Then the data counted by the counter 52 represents the ES on the primary channel 38, and the data counted by the counter 54 represents the ES on the secondary channel 42. Both are indexed by the interface index 68. The value of the counter 56 represents the ES on the active channel.

Next, at step 72 performance data is acquired by the performance monitor 28 (FIG. 2), and is stored by the processor 30, using the memory 66. During a one second acquisition interval a framing process executed by the processor 30 inspects data frames of the primary channel 38 and the secondary channel 42, which are accessed via the hardware registers 60, 62. The hardware registers 60, 62 are generally read once each second. Typically under interrupt control, the processor 30 stores events of interest in the memory 66. In the case of layers other than the photonic layer, various performance primitives, including anomalies, defects, and failures are identified and accumulated in the counters 52, 54, 56 of the counter sections 46, 48, 50 as is appropriate for the particular network element that is associated with the performance monitor 28. In the case of the photonic layer, actual physical parameters may be stored in the memory 66, in which case incrementation of the counters 52, 54, 56 indicates that violation of threshold values has occurred. Further details of step 72 and the operation of the counters 52, 54, 56 are disclosed hereinbelow.

Following expiration of the current acquisition interval, all relevant performance parameters are established at step 74 and held in the memory 66.

Next, at decision step 76, a test is made to determine if a 15-minute performance monitoring interval has expired. If the determination at decision step 76 is negative, then control returns to step 72. The granularity of performance monitoring is controlled by the length of the acquisition interval in step 72, as the update frequency of the performance parameters is only once each interval. Compliance with industry standards can be assured by controlling the length of the acquisition interval. For example, the above-noted Telcordia publication GR-253-CORE specifies measurement of errored seconds.

If the determination at decision step 76 is affirmative then control proceeds to step 78. At step 78 all totals of the counters in the counter sections 46, 48, 50 for the current 15-minute performance monitoring interval are sent to a higher level performance management module (not shown). In those embodiments, as disclosed hereinbelow, in which there are different host processors for the primary channel 38 and the secondary channel 42, the contents of the counter 56 are supplied only by the processor responsible for monitoring the active channel. All counters are then reset, and control returns to initial step 70.

Figure 4:
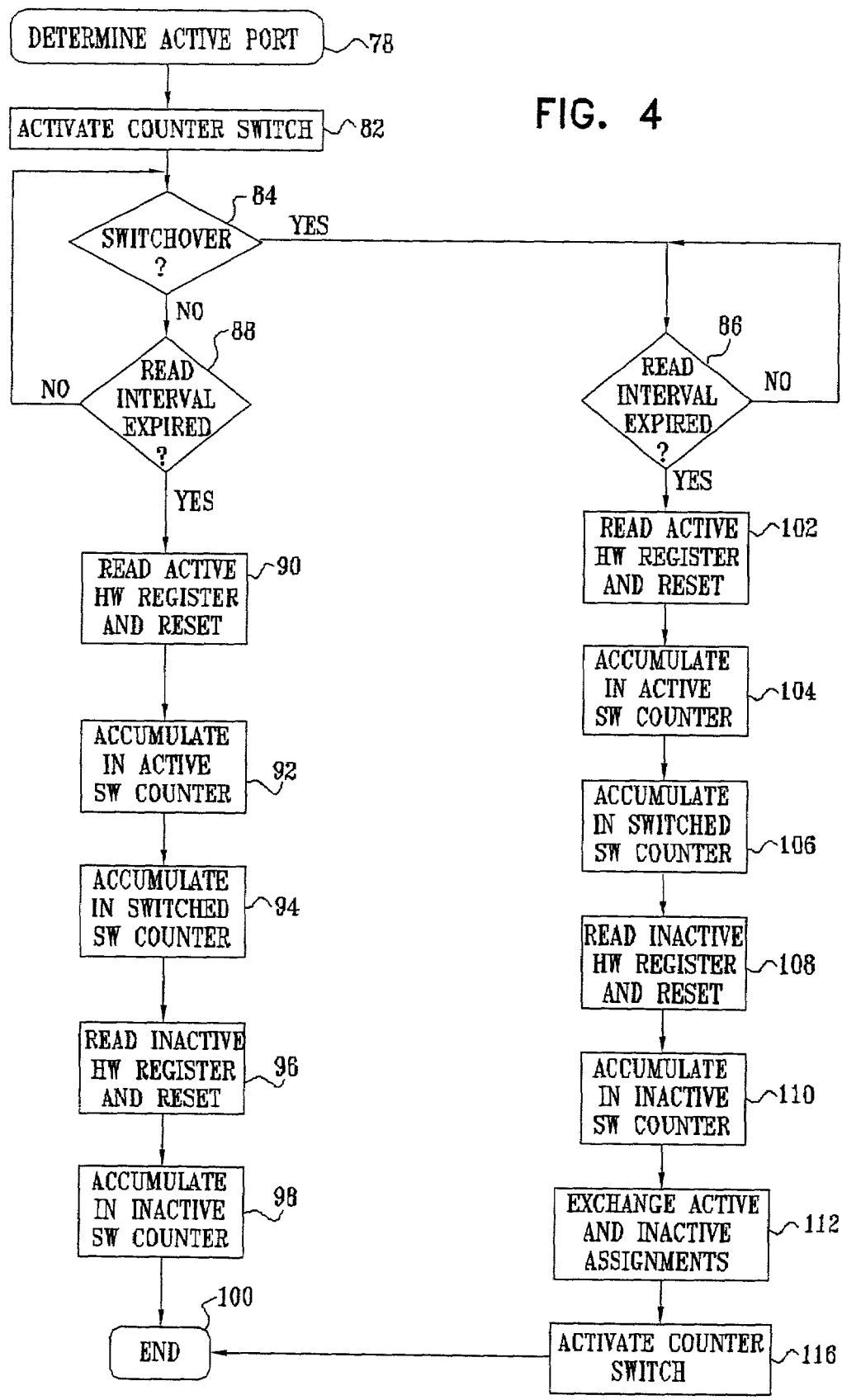
FIG. 4 is a flow chart illustrating portions of the method shown in FIG. 3 in further detail in accordance with a preferred embodiment of the invention.

Reference is now made to FIG. 4, which is a flow chart illustrating step 72 (FIG. 3) in further detail. At initial step 80, the processor 30 (FIG. 2) determines which one of the primary port 40 and the secondary port 44 is currently active. This port is designated the "active port". The other one of the primary port 40 and the secondary port 44 is designated the "inactive port". The counter 52 or the counter 54 having a fixed, nonswitchable relationship to the currently active port is designated the "active channel counter". The other one of the counter 52 and the counter 54 is designated the "standby-channel counter". The counter 56 is referred to as the "switched counter", as its connection with the current active port is regulated by the switch 64 (FIG. 2) as explained above.

Next, at step 82 the switch 64 is actuated, and connects the counter 56 to the port that was determined in step 72 to be the active port.

Control now passes to decision step 84 where a determination is made whether a protection switchover between the primary channel 38 and the secondary channel 42 has occurred.

If the determination at decision step 84 is affirmative, then control passes to delay step 86, which will be disclosed below.

If the determination at decision step 84 is negative then control proceeds to decision step 88, where a determination is made whether a predetermined read interval has expired. Preferably, the read interval is 1 second.

If the determination at decision step 88 is negative, then control returns to decision step 84.

If the determination at decision step 88 is affirmative then control proceeds to step 90. Here the processor 30 reads the hardware register of the active port, and resets this hardware register. While the disclosure of step 90 relates to one performance parameter and the counter section 46, it will be understood that step 90 and subsequent steps apply equally to different performance parameters that are associated with different counter sections in the performance monitor 28. The different performance parameters may be processed concurrently.

Control proceeds to step 92, where the value that was read in step 90 is accumulated into the active channel counter.

Next, at step 94, the value that was read in step 90 is accumulated into the counter 56, which has a switched connection with the hardware register of the active port.

Control now passes to step 96, where the processor 30 reads the hardware register of the inactive port, and resets this hardware register.

Next, at step 98, the value that was read in step 96 is accumulated into the standby-channel counter.

Control now passes to final step 100, where the procedure ends, it being understood with reference to FIG. 3, that the procedure disclosed with reference to FIG. 4 is an expansion of step 72, and is performed periodically.

Delay step 86 is performed if the determination at decision step 84 is affirmative, indicating that a switchover has occurred between the primary and secondary channels. A delay is executed until the current read interval expires. Delay step 86 is introduced to simplify the implementation of the technique. This is practical when the read interval is short, or if some loss of precision can be tolerated.

When the current read interval has expired control proceeds to step 102, where the processor 30 reads the hardware register of the active port, and resets this hardware register.

Control proceeds to step 104, where the value that was read in step 102 is accumulated into the active channel counter.

Next, at step 106, the value that was read in step 102 is accumulated into the counter 56, which has a switched connection with the hardware register of the active port.

Control now passes to step 108, where the processor 30 reads the hardware register of the inactive port, and resets this hardware register.

Next, at step 110, the value that was read in step 108 is accumulated into the standby-channel counter.

Next, at step 112 the assignments of the active and standby-channel counters are exchanged. For example, if the primary port 40 and the counter 52 were initially the active port and active channel counter, they now become the inactive port and standby-channel counter respectively. The secondary port 44 and the counter 54 become the active port and active channel counter respectively. On entering step 112, the counter 52 is associated with the primary port 40, and the counter 54 is associated with the secondary port 44. The primary port 40 is the active channel, and the secondary port 44 is the inactive channel. The counter 56 is associated with the primary port 40.

Next in step 114 the switch 64 is actuated, and the counter 56 is disconnected from its current port, which is now inactive, and is connected to the active port. Upon completion of the switchover in step 112 and step 114, the primary port 40 is the inactive channel, and the secondary port 44 is the active channel. The counter 56 is associated with the secondary port 44. Control then proceeds to final step 100.

First Alternate Embodiment

Figure 5:
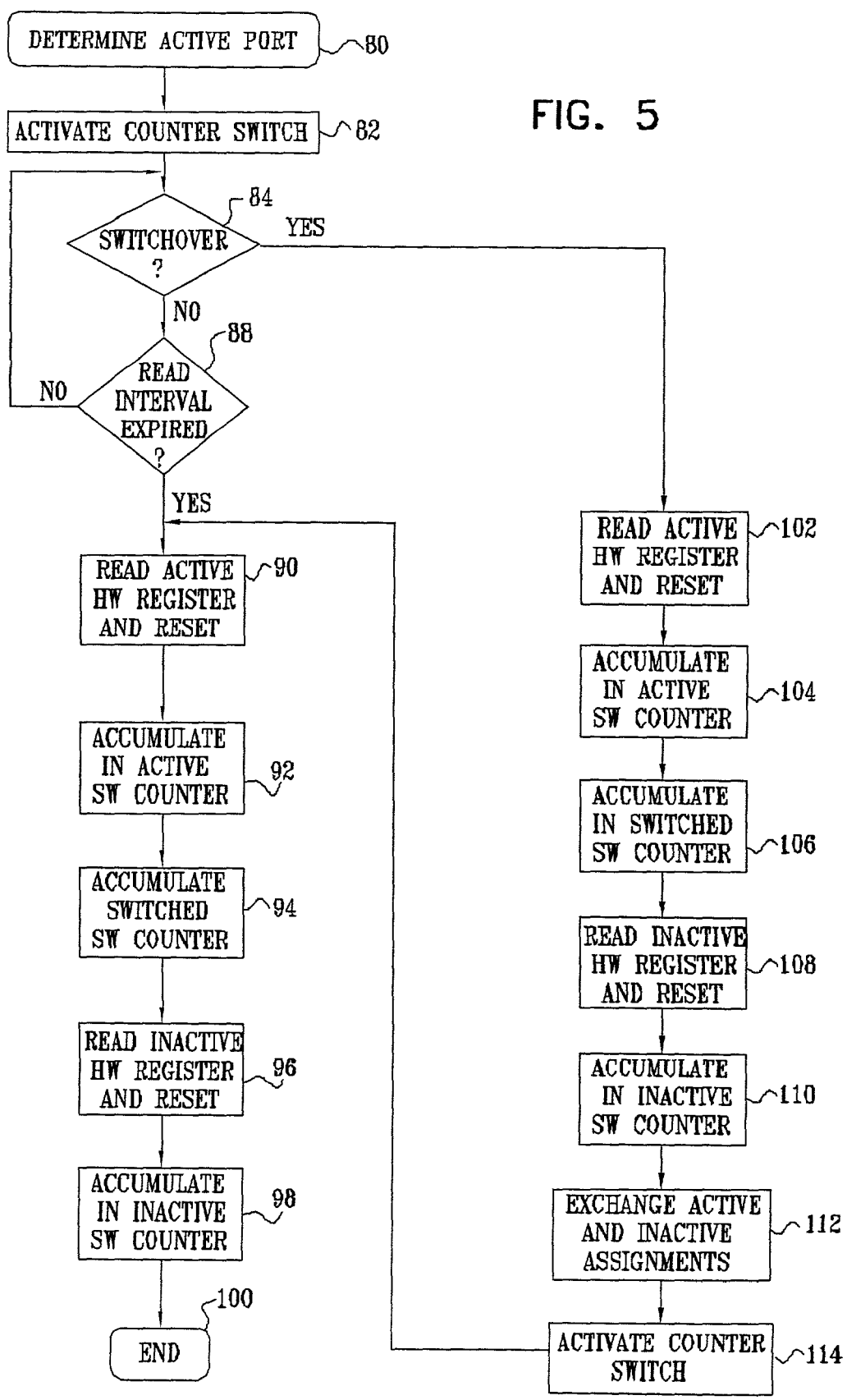
FIG. 5 is a flow chart illustrating portions of the method shown in FIG. 3 in further detail in accordance with an alternate embodiment of the invention.

Reference is now made to FIG. 5, which is a flow chart illustrating an alternative embodiment of step 72 (FIG. 3). The procedure of FIG. 5 is similar to FIG. 4, in which like reference numbers denote the same elements. However, following completion of step 114, accumulation of data in the hardware registers 60, 62 is continued for the duration of the current read interval. All data accumulating during the current read interval, subsequent to the switchover that was detected in decision step 84, is accumulated in the reassigned counters. Control then returns immediately to decision step 88. This embodiment has the advantage of greater precision, at the cost of more complex control requirements.

In the embodiment of FIG. 4, if a switchover occurred during the read interval, the processor is required to wait until the end of the read interval, then read the hardware registers 60, 62, accumulate the performance management data into the counters 52, 54, 56, and then switch the association of the counter 56 (the active counter) to the 'new' Active channel.

In the embodiment of FIG. 5, in order to improve accuracy, once the switchover occurs, the processor immediately reads the hardware registers 60, 62, accumulates the performance management data into the counters 52, 54, 56, and switches the association of the counter 56 (the active counter) to the new active channel. Then, at the end of the read interval the processor is again reads and accumulate the performance management data into the counters 52, 54, 56, except now the active counter is assigned to the new active channel.

EXAMPLE 1

Reference is now made to FIG. 5, which is a flow chart illustrating an alternative embodiment of step 72 (FIG. 3). The procedure of FIG. 5 is similar to FIG. 4, in which like reference numbers denote the same elements. However, following completion of step 114, accumulation of data in the hardware registers 60, 62 is continued for the duration of the current read interval. All data accumulating during the current read interval, subsequent to the switchover that was detected in decision step 84, is accumulated in the reassigned counters. This embodiment has the advantage of greater precision, at the cost of more complex control requirements.

TABLE 2

| Interface | T = 0 | T = 5 (switchover to STBY) |
| --- | --- | --- |
| PRI | Tx Pck = 1000 | Tx Pck = 0 |
| SEC | Tx Pck = 0 | Tx Pck = 2000 |
| ACTIVE | Tx Pck = 1000 | Tx Pck = 3000 |

At the end of the 15-minutes interval the host processor sends the accumulated Tx Pck counts for the primary channel (PRI), the secondary channel (SEC) and the switched counter (ACTIVE), which is the counter 56 (FIG. 2).

The primary channel was active during the first third of the interval. During that time, 1000 packets were transmitted via the port. Due to the fact that switchover occurred in the fifth minute, the secondary channel became active for the last two-thirds of the interval. During this time, the system transmitted 2000 packets. A total of 3000 packets were transmitted across the network during the 15-minute interval.

The performance values in the MIB of the network element are shown in Table 3.

TABLE 3

| Index | Tx Pck |
| --- | --- |
| PRI (ifIndex) | 1000 |
| SEC (ifIndex) | 2000 |
| ACTIVE (virtualIndex) | 3000 |

EXAMPLE 2

In order to provide a customer with a 1:1 virtual protection circuit in an MPLS network, the network has a primary and a secondary MPLS tunnel extending from point to point, each one passing through a different physical medium. Label edge routers on both service end points separately perform performance monitoring data collection for each tunnel separately. Performance collection is also made on the active tunnel.

Second Alternate Embodiment

Figure 6:
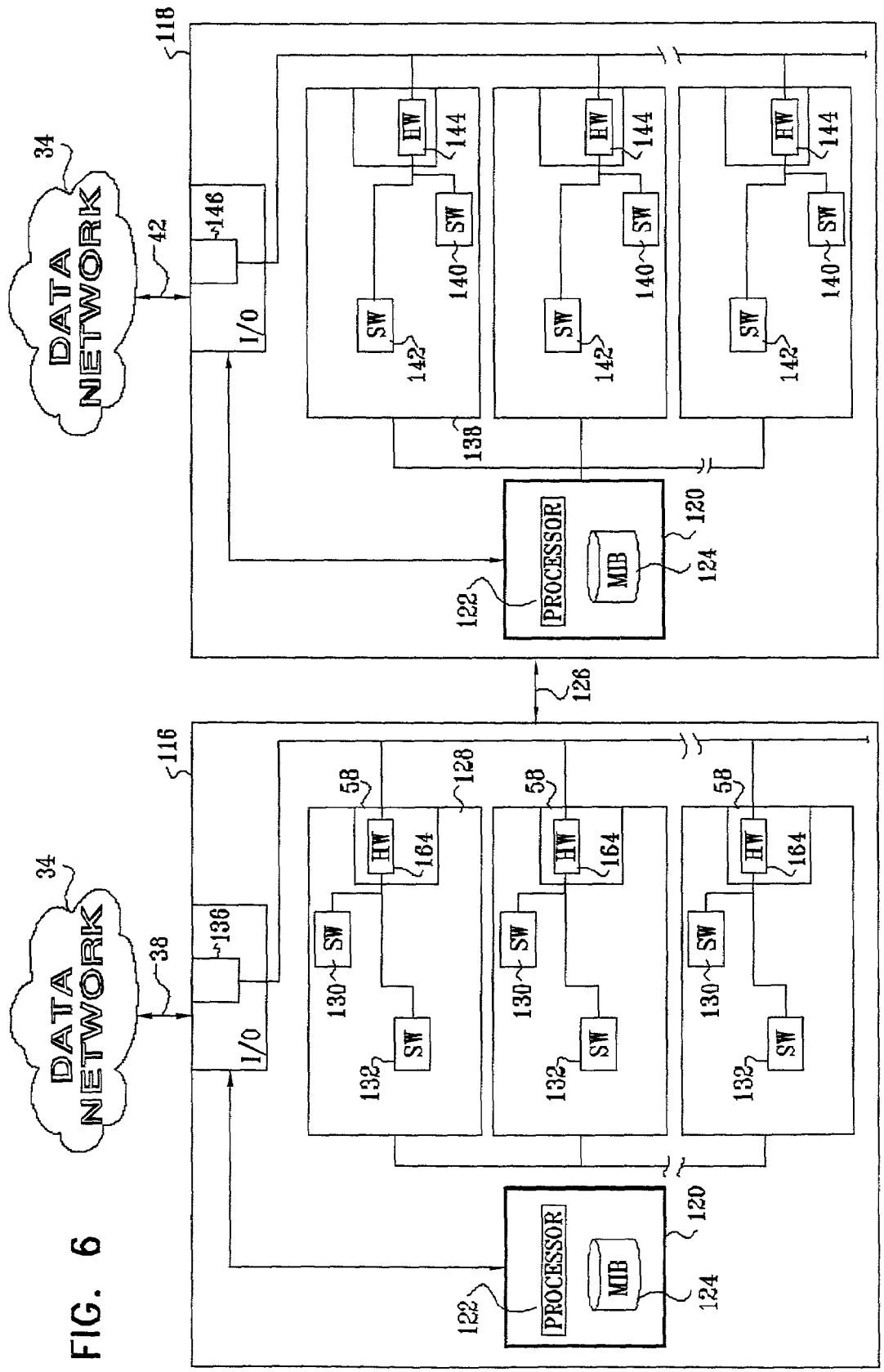
FIG. 6 is a block diagram of a performance manager which is constructed and operative in accordance with an alternate embodiment of the invention.

Reference is now made to FIG. 6, which is a detailed block diagram of a performance manager in the network shown in FIG. 1 in accordance with an alternate embodiment of the invention. In this embodiment the primary port and the secondary or standby port are located on different modules, and are managed by different host processors. The performance manager now comprises a performance monitor unit 116, and a performance monitor unit 118. Both of these units are identical, and can have a configuration similar to the performance monitor 28 (FIG. 2), with some elements being omitted. However, for clarity of presentation, certain elements of the performance monitor unit 118 are given different reference numerals from corresponding elements of the performance monitor unit 116. The performance monitor units 116. 118 each have a computational module 120 that includes a processor 122, and a MIB unit 124. The performance monitor units 116, 118 can intercommunicate via a link 126.

The performance monitor unit 116 is associated with the primary channel 38, and the performance monitor unit 118 is associated with the performance monitor unit 118.

A counter section 128 in the performance monitor unit 116 has software counters 130 132, both of which are associated with a hardware register 134. The hardware register 134 is linked to a port 136, which is connected to the primary channel 38. A counter section 138 in the performance monitor unit 118 has software counters 140, 142, both of which are associated with a hardware register 144. The hardware register 144 is linked to a port 146, which is connected to the secondary channel 42.

Figure 7:
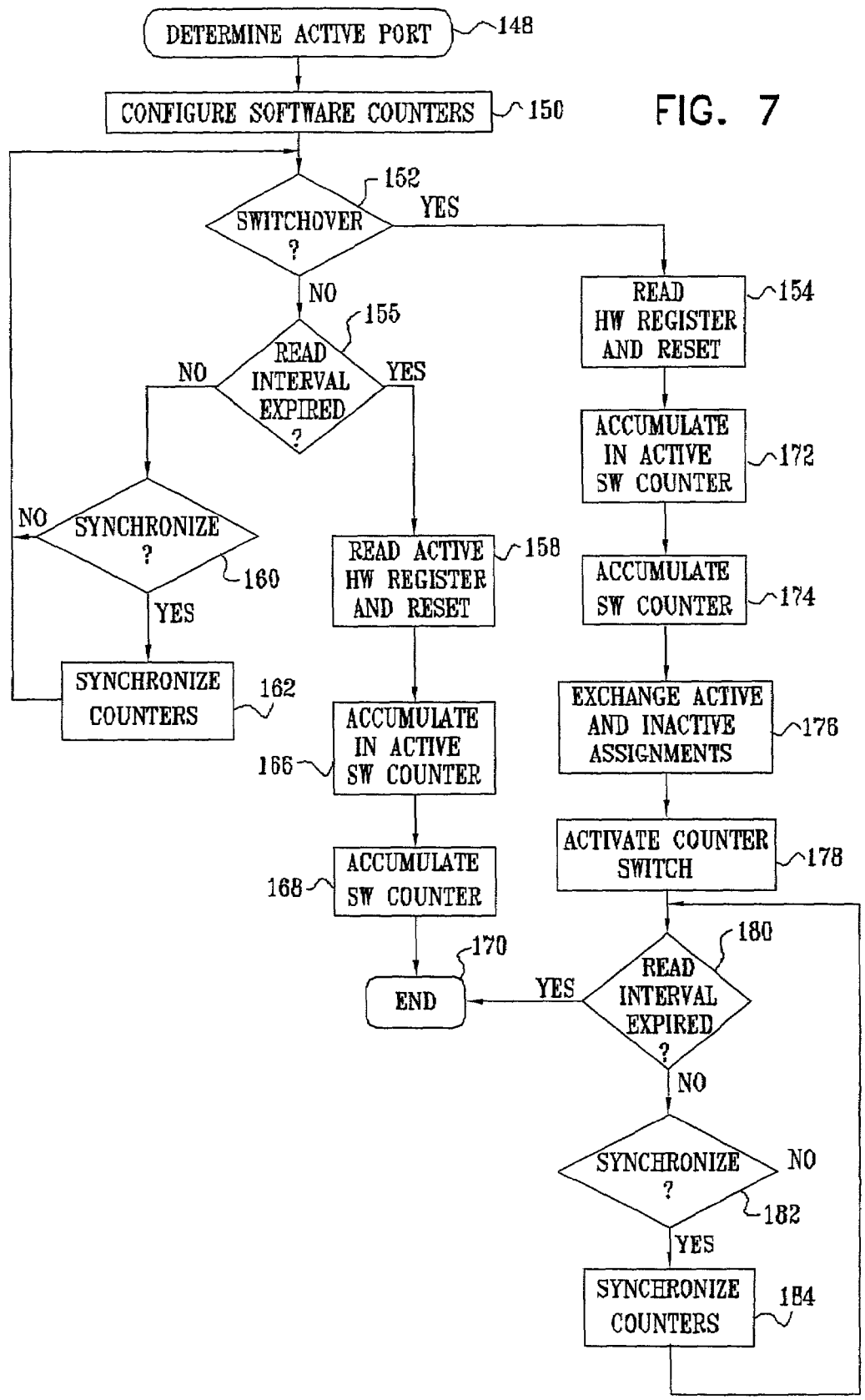
FIG. 7 is a flow chart illustrating a method of performance monitoring that is adapted to use with the performance manager illustrated in FIG. 6.

Reference is now made to FIG. 7, which is a flow chart illustrating an alternate embodiment of step 72 (FIG. 3), wherein step 72 is performed using the embodiment illustrated in FIG. 6. At initial step 148 the processor 122 (FIG. 6) of the performance monitor unit 116 determines which one of the primary channel 38 and the secondary channel 42 is currently active. This channel is designated the "active channel". The other channel is designated the "inactive channel". It is assumed that the performance monitor unit 116 has been assigned to manage the active channel, and the performance monitor unit 118 the inactive channel. In the performance monitor unit 116, the software counter 130, having a fixed, nonswitchable relationship to the currently active port is designated the "active channel counter". In the performance monitor unit 118, software counter 140 having a fixed, nonswitchable relationship to the currently inactive port is designated the "inactive channel counter".

The performance monitor unit 116 is responsible for the management of the active channel using the active counter. At step 150, in the performance monitor unit 116, the processor 122 associates the software counter 130 with the port 136. In the performance monitor unit 118, the processor 122 disconnects the software counter 142 from the port 146. Thus, only the performance monitor unit 116 accumulates performance parameter data in the corresponding software counter 132.

Control now passes to decision step 152 where a determination is made whether a protection switchover between the primary channel 38 and the secondary channel 42 has occurred.

If the determination at decision step 152 is affirmative then control proceeds to step 154, which will be disclosed below.

If the determination at decision step 152 is negative then control proceeds to decision step 156, where a determination is made whether a predetermined read interval has expired. Preferably, the read interval is one second.

If the determination at decision step 156 is affirmative then control proceeds to step 158, which is disclosed below.

If the determination at decision step 156 is negative then control passes to decision step 160, where a determination is made if a synchronization interval has elapsed. In its normal mode of operation, the performance monitor unit 118 does not utilize the software counter 142 for accumulation of performance data. Nevertheless, in order to prevent loss of the information in the software counter 132 in the event of equipment failure, it is desirable that the software counter 142 be coordinated with the software counter 132 periodically. Should the either of the performance monitor units 116, 118 fail, the remaining performance monitor unit can seamlessly assume the management of both the primary channel 38 and the secondary channel 42 using one of the modes of operation disclosed above with reference to FIG. 4 and FIG. 5.

If the determination at decision step 160 is negative then control returns to decision step 152.

If the determination at decision step 160 is affirmative then control proceeds to step 162. The value of the counter 56 is now communicated to the performance monitor unit 118, using the link 126, and the software counter 142 is updated. Now both the software counter 132 and the software counter 142 contain the same information. It is recommended that this synchronization step be performed once every second. Control returns to decision step 152.

In some embodiments decision step 160 and step 162 may be omitted, in which case control would return directly to decision step 152 when the determination at decision step 156 is negative. Omitting counter synchronization simplifies implementation, at the cost of fault tolerance.

Step 158 is performed if the determination at decision step 156 is affirmative. Here the processor 122 of the performance monitor unit 116 reads a hardware register 164, and resets this hardware register. The processor 122 of the performance monitor unit 118 reads the hardware register 144, and resets this hardware register.

Control proceeds to step 166, where the values that were read in step 158 are accumulated into the respective active channel counters of the performance monitor units 116, 118.

Next, at step 168, the value that was read in step 158 by the processor 122 of the performance monitor unit 116 is accumulated into the software counter 132 in the performance monitor unit 116.

Control now passes to final step 170, where the procedure ends.

Step 154 is performed if the determination at decision step 152 is affirmative, indicating that a switchover has occurred between the primary and secondary channels. Here the processor 122 of the performance monitor unit 116 reads the hardware register 164, and resets this hardware register. The processor 122 of the performance monitor unit 118 reads the hardware register 144, and resets this hardware register.

Control proceeds to step 172, where the values that were read in step 154 are accumulated into the respective active channel counters of the performance monitor units 116, 118.

Next, at step 174, the value that was read in step 154 by the processor 122 of the performance monitor unit 116 is accumulated into the software counter 132 of the performance monitor unit 116.

Next, at step 176 the assignments of the respective active and standby-channel counters are exchanged in each of the performance monitor units 116, 118.

Next, at step 178 in the performance monitor unit 116, the software counter 132 is disconnected from its current port, which is now inactive. In the performance monitor unit 118, software counter 142 is associated with the secondary channel 42, which is now the new active channel.

Control now passes to delay step 180, where a determination is made whether the current read interval has expired.

If the determination at delay step 180 is affirmative, then control then proceeds to final step 170. As explained above in the discussion of FIG. 5, delay step 180 is optional. The discussion given above regarding the differences between the embodiments of FIG. 4 and FIG. 5 is also applicable to this embodiment. In those embodiments in which the delay step 180 is omitted, control would pass directly from step 178 to decision step 156.

If the determination at delay step 180 is negative, then control passes to decision step 182, where a determination is made if a synchronization interval has elapsed.

If the determination at decision step 182 is negative, then control returns to delay step 180.

If the determination at decision step 182 is affirmative, then control proceeds to step 184, where synchronization is accomplished by transferring the contents of the software counter 142 to the software counter 132 over the link 126. Control then returns to delay step 180.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

The invention claimed is:

1. A method of monitoring performance of a communications network, comprising the steps of:
    coupling a first communication channel and a second communication channel together in a protection-switching configuration;
    simultaneously monitoring said first communication channel and said second communication channel in a common layer of said network so as to accumulate first performance data of said first communication channel in a first counter and to accumulate second performance data of said second communication channel in a second counter, while accumulating said first performance data in an active counter during a first time interval;
    detecting a protection switchover between said first communication channel and said second communication channel; and
    thereafter accumulating said second performance data in said active counter during a second time interval so that said active counter contains a sum of said first performance data accumulated during said first time interval with said second performance data accumulated during said second time interval.

2. The method according to claim 1, further comprising the steps of:
    memorizing a value of said active counter following expiration of a read interval; and
    resetting said active counter.

3. The method according to claim 1, wherein said communications network is an optical communications network.

4. The method according to claim 3, wherein said communications network is a SONET network.

5. The method according to claim 3, wherein said communications network is an SDH network.

6. The method according to claim 1, wherein said protection-switching configuration is a 1+1 architecture.

7. The method according to claim 1, wherein said protection-switching configuration is a 1:1 architecture.

8. The method according to claim 1, wherein said protection-switching configuration is a 1:n architecture.

9. A method of monitoring performance of a communications network, comprising the steps of:
    coupling a first communication channel and a second communication channel together in a protection-switching configuration, in which one of said channels operates as an active channel;
    simultaneously monitoring said first communication channel and said second communication channel so as to accumulate first performance data in a first counter and second performance data in a second counter with respect to said first communication channel and said second communication channel respectively;
    while said first communication channel is operating as said active channel during a first time interval, accumulating said first performance data in a third counter;
    detecting a protection switchover between said first communication channel and said second communication channel; and
    thereafter, during a second time interval, accumulating said second performance data in said third counter so that said third counter contains a sum of said first performance data accumulated during said first time interval with said second performance data accumulated during said second time interval.

10. The method according to claim 9, further comprising the steps of:
    after performing said step of detecting said protection switchover and prior to performing said step of accumulating said second performance data in said third counter;
    resetting said first counter; and
    resetting said second counter.

11. The method according to claim 9, further comprising the steps of:
    memorizing a value of said third counter following expiration of a read interval; and
    resetting said third counter.

12. The method according to claim 9, further comprising the step of:
    after performing said step of detecting said protection switchover delaying performance of said step of accumulating said second performance data in said third counter until expiration of a read interval.

13. The method according to claim 9, wherein said protection-switching configuration is a 1+1 architecture.

14. The method according to claim 9, wherein said protection-switching configuration is a 1:1 architecture.

15. The method according to claim 9, wherein said protection-switching configuration is a 1:n architecture.

16. A method of monitoring performance of a data network, comprising the steps of:
    monitoring a first channel of an optical communications network;
    simultaneously monitoring a second channel of said optical communications network;
    accumulating first data that is received on said first channel in a first counter;
    accumulating second data that is received on said second channel in a second counter;
    accumulating said first data in a third counter during a first time interval;
    detecting a protection switchover between said first channel and said second channel; and
    thereafter, during a second time interval, accumulating said second data in said third counter so that said third counter contains a sum of said first data accumulated during said first time interval with said second data accumulated during said second time interval.

17. The method according to claim 16, further comprising the steps of:

after performing said step of detecting said protection switchover and prior to performing said step of accumulating said second data in said third counter;
resetting said first counter; and
resetting said second counter.

18. The method according to claim 16, further comprising the steps of:
memorizing a value of said third counter following expiration of a read interval; and
resetting said third counter.

19. The method according to claim 16, further comprising the step of:
after performing said step of detecting said protection switchover delaying performance of said step of accumulating said second data in said third counter until expiration of a read interval.

20. The method according to claim 16, wherein said steps of monitoring said first channel and monitoring said second channel are performed at a system interface.

21. The method according to claim 16, wherein said optical communications network is an SDH network.

22. A method of monitoring performance of a data network, comprising the steps of:
monitoring a first channel in a SONET network;
simultaneously monitoring a second channel in said SONET network;
accumulating first data that is received on said first channel in a first counter;
accumulating second data that is received on said second channel in a second counter;
accumulating said first data in a third counter during a first time interval;
detecting a protection switchaver between said first channel and said second channel; and
thereafter, during a second time interval, accumulating said second data in said third counter so that said third counter contains a sum of said first data accumulated during said first time interval with said second data accumulated during said second time interval.

23. The method according to claim 22, further comprising the steps of:
after performing said step of detecting said protection switchover and prior to performing said step of accumulating said second data in said third counter;
resetting said first counter; and
resetting said second counter.

24. The method according to claim 22, further comprising the steps of:
memorizing a value of said third counter following expiration of a read interval; and
resetting said third counter.

25. The method according to claim 22, further comprising the step of:
after performing said step of detecting said protection switchover delaying performance of said step of accumulating said second data in said third counter until expiration of a read interval.

26. The method according to claim 22, wherein said steps of monitoring said first channel and monitoring said second channel are performed at a system interface of said SONET network.

27. A performance monitoring apparatus for a data network, comprising:
a first port connectable to a first channel of a communications network;
a second port connectable to a second channel of said communications network;
a first counter for accumulating first data that is received in said first port;
a second counter for accumulating second data that is received in said second port;
a third counter;
a switch for associating said third counter with one of said first port and said second port, said third counter accumulating one of said first data and said second data responsive to said switch; and
a processor for controlling said first counter, said second counter, slid third counter and said switch;
wherein in a first mode of operation said first counter and said third counter accumulate said first data, and said second counter accumulates said second data; and
in a second mode of operation said first counter accumulates said first data, and said second counter and said third counter accumulate said second data so that said third counter contains a sum of said first data accumulated in said first mode of operation during a first time interval with said second performance data accumulated in said second mode of operation during a second time interval subsequent to said first time interval.

28. The performance monitoring apparatus according to claim 27, further comprising a data memory accessible by said processor, wherein responsive to control signals of said processor, values accumulated in said first counter, said second counter, and said third counter are stored in said data memory.

29. The performance monitoring apparatus according to claim 28, wherein said control signals are generated at predefined read intervals.

30. The performance monitoring apparatus according to claim 27, wherein said first counter, said second counter, and said third counter are software counters.

31. The performance monitoring apparatus according to claim 27, wherein said first port and said second port are disposed at a systems interface of said communications network.

32. The performance monitoring apparatus according to claim 27, wherein said communications network is an optical communications network.

33. The pert performance monitoring apparatus according to claim 32, wherein said optical communications network is a SONET network.

34. The performance monitoring apparatus according to claim 32, wherein said optical communications network is an SDH network.

35. A performance monitoring apparatus for a data network, comprising:
a first module and a second module, each of said first module and said second module comprising:
a first port connectable to a first channel of a communications network;
a second port connectable to a second channel of said communications network;
a first counter for accumulating first data that is received in said first port;
a second counter for accumulating second data that is received in said second port;
a third counter;
a switch for associating said third counter with one of said first port and said second port, said third counter accumulating one of said first data and said second data responsive to said switch; and
a processor for controlling said first counter, said second counter, said third counter and said switch;

wherein in a first mode of operation said first counter of said first module and said third counter of said first module accumulate said first data and said second counter of said second module accumulates said second data; and in a second mode of operation said second counter of said first module accumulates said first data, and said first counter of said second module and said third counter of said second module accumulates said second data so that said third counter contains a sum of said first data accumulated in said first mode of operation during a first time interval with said second performance data accumulated in said second mode of operation during a second time interval subsequent to said first time interval.

36. The performance monitoring apparatus according to claim 35, further comprising a data memory, wherein values held in said first counter, said second counter, and said third counter are periodically stored in said data memory responsive to control signals of said processor.

37. The performance monitoring apparatus according to claim 35, wherein said first counter, said second counter, and said third counter are software counters.

38. The performance monitoring apparatus according to claim 35, wherein said first module and said second module are disposed at a systems interface of said communications network.

39. The performance monitoring apparatus according to claim 35, wherein said communications network is an optical communications network.

40. The performance monitoring apparatus according to claim 39, wherein said optical communications network is a SONET network.

41. The performance monitoring apparatus according to claim 39, wherein said optical communications network is an SDH network.

42. The performance monitoring apparatus according to claim 35, wherein responsive to control signals of said processor, a content of said third counter of said first module is transferred to said third counter of said second module.

* * * * *

UNITED STATES PATENT AND TRADEMARK OFFICE
CERTIFICATE OF CORRECTION

PATENT NO. : 7,158,721 B2  Page 1 of 1
APPLICATION NO. : 10/082771
DATED : January 2, 2007
INVENTOR(S) : Sharon Mantin et al.

It is certified that error appears in the above-identified patent and that said Letters Patent is hereby corrected as shown below:

Column 6, line 2, "can he" should read --can be--;

Column 19, claim 22, line 33, "switchaver" should read --switchover--;

Column 20, claim 27, line 11, "slid third" should read --said third--; and

Column 20, claim 33, line 43, "The pert performance" should read --The performance--.

Signed and Sealed this

Fourth Day of December, 2007

JON W. DUDAS
*Director of the United States Patent and Trademark Office*